US012215848B1

(12) United States Patent
Jiang et al.

(10) Patent No.: US 12,215,848 B1
(45) Date of Patent: Feb. 4, 2025

(54) STAGE LIGHT FIXTURE WITH LIGHT HEAD HAVING EXTERNAL HEAT DISSIPATION

(71) Applicant: Guangzhou Haoyang Electronic Co., Ltd., Guangzhou (CN)

(72) Inventors: Weikai Jiang, Guangzhou (CN); Mingjian Yuan, Guangzhou (CN); Xiaolong Zheng, Guangzhou (CN)

(73) Assignee: GUANGZHOU HAOYANG ELECTRONIC CO., LTD., Guangzhou (CN)

( * ) Notice: Subject to any disclaimer, the term of this patent is extended or adjusted under 35 U.S.C. 154(b) by 0 days.

(21) Appl. No.: 18/400,259

(22) Filed: Dec. 29, 2023

(30) Foreign Application Priority Data

Aug. 31, 2023 (CN) ........................ 202322371105.5

(51) Int. Cl.
*F21V 29/60* (2015.01)
*F21V 21/30* (2006.01)
*F21V 29/70* (2015.01)
*F21W 131/406* (2006.01)

(52) U.S. Cl.
CPC .............. *F21V 29/60* (2015.01); *F21V 21/30* (2013.01); *F21V 29/70* (2015.01); *F21W 2131/406* (2013.01)

(58) Field of Classification Search
CPC ........ F21V 23/406; F21V 21/30; F21V 29/60; F21V 29/70
See application file for complete search history.

(56) References Cited

U.S. PATENT DOCUMENTS 4,701,833 A * 10/1987 Bornhorst ............. F21V 29/673 362/426
11,060,713 B2 * 7/2021 Jiang .................. H05K 7/20263
2015/0285483 A1 * 10/2015 Kjaer ...................... F21V 21/15 362/373

OTHER PUBLICATIONS

Innovation Q+ NPL Search (Year: 2024).*

* cited by examiner

*Primary Examiner* — Anabel Ton
(74) *Attorney, Agent, or Firm* — MUNCY, GEISSLER, OLDS & LOWE, P.C.

(57) ABSTRACT

A stage light fixture with a light head having external heat dissipation includes a light head for projecting light beams, which is formed as a cylinder with a light outlet which is covered by a light emitting lens, and a support arm for supporting the light head to rotate via a pivoting shaft. At least one first blower is provided in the support arm, which is configured to blow air around the light head to flow and thus cool the light head. According to the present invention, active heat dissipation is formed and enclosed interior of the cylinder is simultaneously ensured without damage to the existed structure of the light head. The light head thus can be effectively cooled in a way that the air around the light head is blown to flow and promptly entrain the heat on the side wall thereof via the first blower.

10 Claims, 6 Drawing Sheets

STAGE LIGHT FIXTURE WITH LIGHT HEAD HAVING EXTERNAL HEAT DISSIPATION

CROSS REFERENCE TO RELATED APPLICATIONS

The present application claims priorities from Chinese Application No. CN 202322371105.5 filed on Aug. 31, 2023, all of which are hereby incorporated herein by reference.

TECHNICAL FIELD

The present invention relates to the technical field of stage light fixtures, and more particularly, relates to a stage light fixture with a light head having external heat dissipation.

BACKGROUND

The light head of the stage light fixture is usually used to generate all kinds of light effects and project light spots with specific light effects to the target object. Therefore, the interior of the light head is equipped with a light source and various effect-forming modules, which will generate a large amount of heat during operation of the stage light fixture. In addition, in order to meet the requirement of dry running environment for the inside equipment, the light head is usually tightly enclosed. Accordingly, heat dissipation is of great importance for the light head to keep the stage light fixture in normal operation. Typically, the light head is cooled via heat exchange of the side walls thereof with the outside.

However, heat in the side wall is dissipated heat by natural convection to the outside in such method, which is a passive heat-dissipation method, intrinsically having low heat-dissipating efficiency. On the other hand, during operation of the stage light fixture, the side wall close to the light source may generally accumulate massive heat, causing high temperature there, while the side wall corresponding to the space where less effect-forming modules are mounted may usually have low temperature, which thus makes distribution of heat in the whole side wall uneven. Therefore, the position in urgent need of heat dissipation would not be cooled promptly using such method. As a result, the light source and the effect-forming modules will always expose to high temperature, causing local overheating and even damaged, and thus shortening service life of the stage light fixture.

SUMMARY

It is therefore desirable to provide a stage light fixture with a light head having external heat dissipation in the present invention, which can achieve rapid heat dissipation of the outside of the light head.

According to the present invention, a stage light fixture with a light head having external heat dissipation includes a light head for projecting light beams and a support arm for supporting the light head to rotate via a pivoting shaft. The light head is preferably formed as a cylinder with a light outlet which is covered by a light emitting lens. In the present invention, at least one first blower is provided in the support arm to blow the air around the light head to flow and thus cool the outside of the light head.

In the present invention, active heat dissipation is formed and enclosed interior of the cylinder is simultaneously ensured without damage to the existed structure of the light head. Therefore, the light head in the present invention can be effectively cooled in a way that the air around the light head is blown to flow and promptly entrain the heat on the side wall thereof via the at least one blower mounted in the support arm. Meanwhile, the air is blown to continuously flow around the light head under the action of the first blower, as well as making the heat on the side wall of the light head distributed evenly, thereby avoiding heat accumulation and effectively improving heat-dissipation efficiency for the light head.

Particularly, the support arm is provided with an accommodating chamber for accommodating the first blower, and the side of the chamber close to the light head is provided with a first air outlet. With the first blower mounted in the accommodating chamber, it can achieve more compact arrangement for the components in the light head without excessive protruding from the support arm. In addition, the accommodating chamber is formed an air guiding passage together with the first air outlet, such air guiding passage is advantageous for the air to orderly blow to the outer side wall of the light head by the first blower.

The support arm preferably has one horizontal support and two vertical supports, with each end of the horizontal support connected to one end of each vertical support and the light head pivoted to the other end of each vertical support away from the horizontal support. In this situation, the accommodating chamber is arranged in the horizontal support and/or the vertical supports. With such configuration, the light head can rotate relative to the support arm around at least one dimension, and the first blower can be mounted in the horizontal support and/or the vertical supports according to actual demands, which thus can multi-directionally and intentionally blow cooler air to the light head, thereby achieving effective heat dissipation. More preferably, the accommodating chamber crosses over the horizontal support and the vertical supports, the first blower is arranged at the joint of the horizontal support and the vertical supports, with the air-outlet surface of the first blower facing toward the side of the vertical support away from the light head. As there is sufficient room for mounting the first blower at the joint, larger fan can be used as the first blower, thus further improving the heat-dissipation efficiency for the light head.

It is advantageous to arrange the first air outlet close to the pivoting shaft of the light head relative to the support arm. In operation of the stage light fixture, the light head may rotate beyond the range limited by the support arm during rotation around the pivoting shaft. With such design the air can be blown to the light head by the first blower as much as possible, even if the light head constantly rotates, and the air flow from the first air outlet can blow the air around the light head to flow.

In order to increase heat-dissipation area of the cylinder of the light head, the side of the light head close to the support arm is provided with a plurality of first air guiding ribs which are parallel to the length direction of the light head. In addition, air passages are formed between the adjacent air guiding ribs, which can orderly guide the air blown by the first blower to the whole outside of the light head.

A base may be further included for supporting the support arm to rotate according to the present invention. In this situation, a second blower may be further provided in the support arm, which is used for blowing the air around the base to flow and thus cool the base. For most of the current stage light fixtures, the control element such as control panel is arranged in the base, that is, the rotation of the light head and the support arm are controlled by the base. As the space inside the base is usually very limited while with many elements closely mounted, less room is provided for the blower to mount inside the base for heat dissipation. However, the second blower arranged in the support arm in the present invention can achieve heat dissipation for the base by blowing the air on the surface of the base to flow and such air promptly entrains the hot air inside the base. Therefore, according to the present invention the base can also be effectively cooled in such easy way, avoiding over temperature inside the base to damage the control element.

Similar to the light head, the side of the base close to the support arm may also be provided with a plurality of second air guiding ribs extending towards the periphery. Air passages are thus formed between the adjacent air guiding ribs, through which the air blown by the second blower can be guided orderly and flow on the surface of the base. In addition, such second air guiding ribs can increase heat-dissipation area of the base. Therefore, the heat-dissipation efficiency of the base can be effectively improved.

To produce rich and varied light effects, various effect-forming modules can be provided in the light head according to the present invention, including a light shaping component for shaping the light beams, a light filter component for changing the color of the light beams, a pattern component for forming light beams with specific pattern, and/or a lens component for changing divergence angle of the light beams.

In the present invention, the light emitting lens and the cylinder-shape light head is closely cooperated to form an enclosed chamber, in which the effect-forming modules are arranged for changing light effects of the stage light fixture. Such configuration ensures sealing of the light head to avoid water entering the light head to damage the elements therein. Meanwhile, the first blower accelerates the flow rate of the air around the light head. Therefore, the light head of the present invention can simultaneously meet the requirements of waterproof performance and heat dissipation.

In order to direct the heat inside of the light head to the outer side wall thereof, a circulating fan can be further provided in the light head, which is configured to blow the heat air inside the light head to at least one side wall of the light head close to the support arm. In such configuration, the heat inside the light head, especially at the center of the light head, can be guided to the inner side wall thereof by means of the circulating fan, then directed to the outer side wall of the light head via heat exchange, and thus finally removed by the first blower.

DETAILED DESCRIPTION

Figure 1:
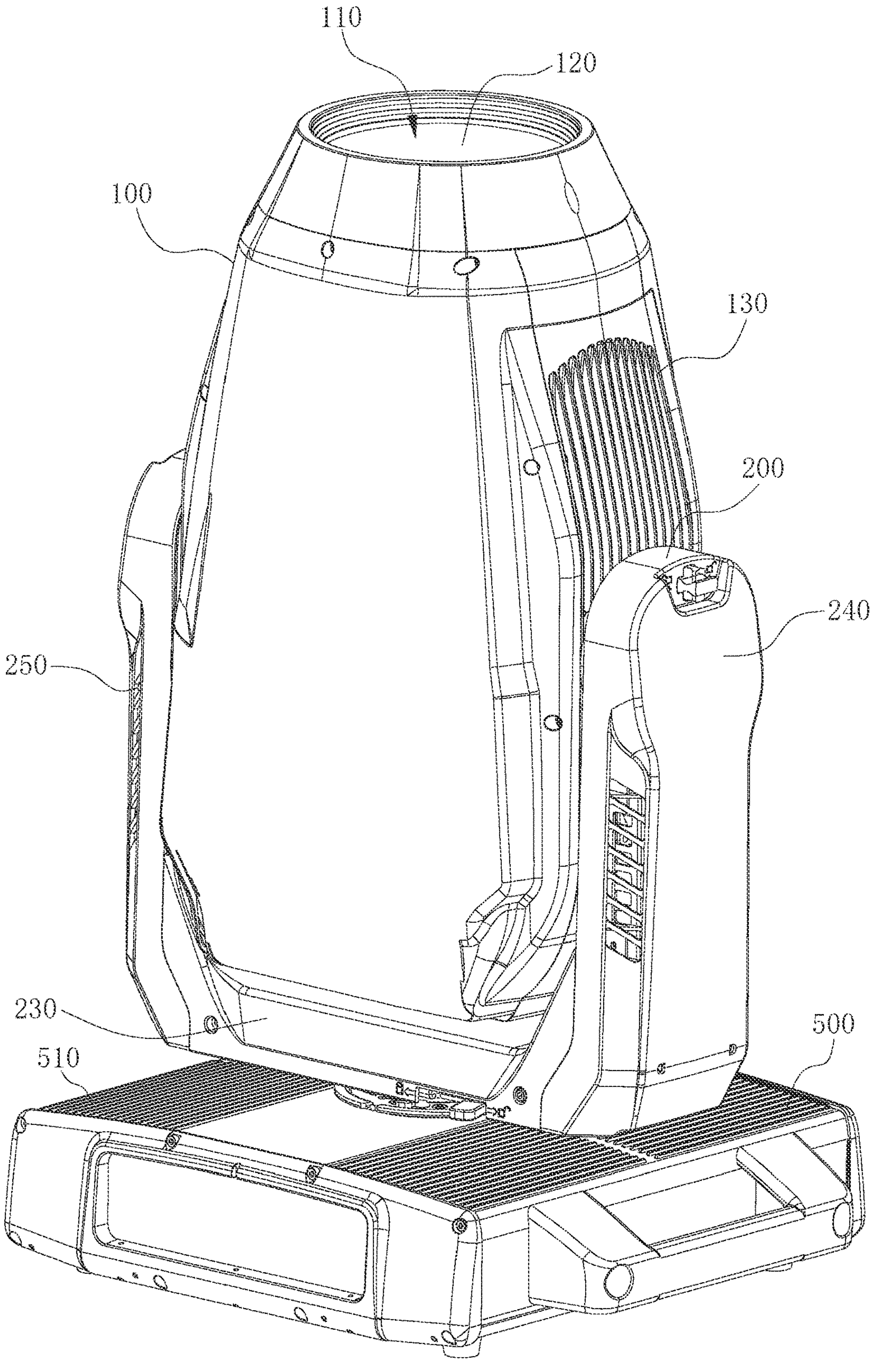
FIG. 1 is a perspective view of a stage light fixture with a light head having external heat dissipation according to an embodiment of the present invention.

The accompanying drawings are for exemplary illustration only, and should not be construed as limitations on this invention. In order to better illustrate the present embodiment, some parts of the accompanying drawings may be omitted, enlarged or reduced, and do not represent the size of actual products. For those skilled in the art, it is understandable that certain well-known structures and descriptions thereof may be omitted in the drawings. The positional relationship described in the drawings is only for exemplary illustration, and should not be construed as a limitation on this invention.

Figure 2:
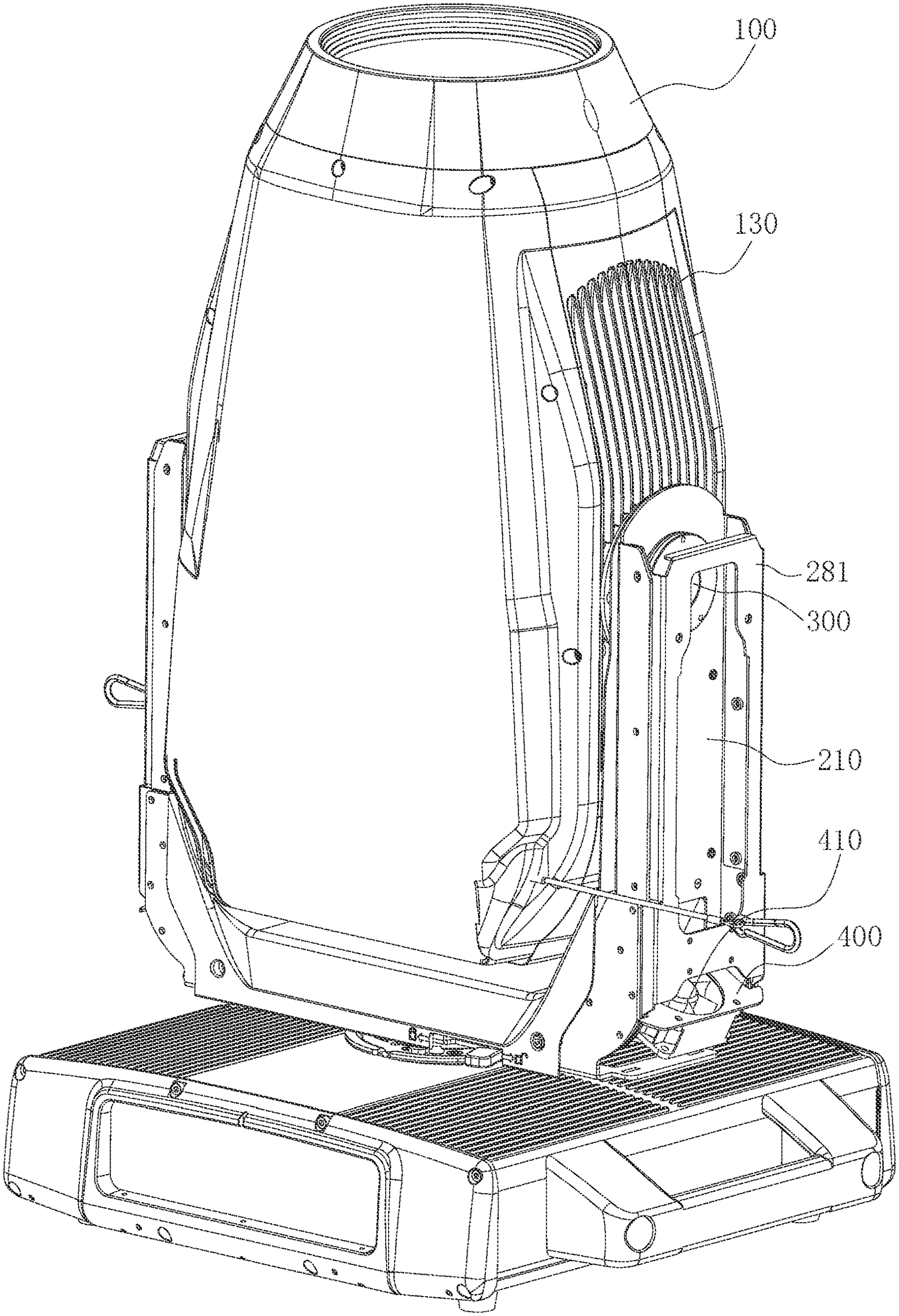
FIG. 2 is another perspective view of the stage light fixture according to an embodiment of the present invention, with a housing of a support arm removed.

FIGS. 1 and 2 depict a stage light fixture with a light head 100 having external heat dissipation according to an embodiment of the present invention, which includes a light head 100 for projecting light beams and a support arm 200 for supporting the light head to rotate via a pivoting shaft 300. The light head 100 is formed as a cylinder with a light outlet 110. A light emitting lens 120 is covered on the light outlet 110. At least one first blower 400 is provided in the support arm 200 to blow the air around the light head 100 to flow and thus cool the outside of the light head 100.

In the present embodiment, active heat dissipation is formed and enclosed interior of the cylinder is simultaneously ensured without damage to the structure of the light head 100. The light head 100 can be effectively cooled in a way that the air around the light head 100 is blown to flow to promptly entrain the heat on the side wall thereof via the blower 400 mounted on the support arm 200. Meanwhile, the air is blown to continuously flow around the light head 100 under the action of the first blower 400, as well as making the heat on the side wall of the light head distributed evenly, thereby avoiding heat accumulation and effectively improving heat-dissipation efficiency for the light head.

Optionally, the first blower 400 can either be arranged at the outside of the support arm 200 or be arranged at the inner side of the support arm 200.

In the illustrated embodiment, the support arm 200 is in a U shape, the light head 100 is pivoted to the inner sides of the support arm 200, and each side of the U-shaped support arm 200 is provided with one blower 400 so that the air at both sides of the light head 100 can be blown to flow, result in enhanced flow rate of the air around the light head 100 and thus improved heat-dissipation efficiency of the light head.

Figure 3:
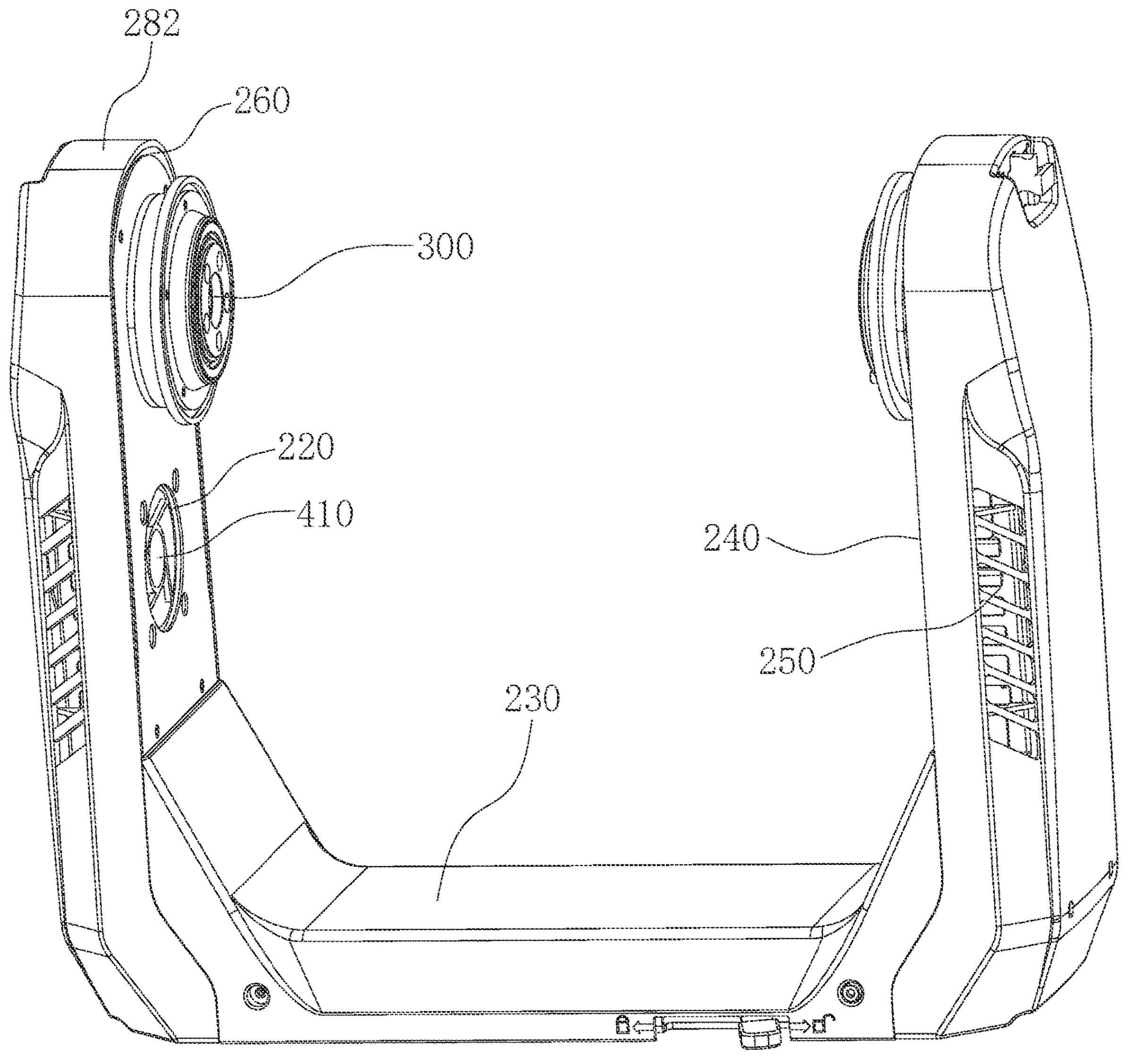
FIG. 3 is a perspective view of a support arm according to an embodiment, in which a first air outlet is covered by an air-outlet surface of a first blower.
Figure 4:
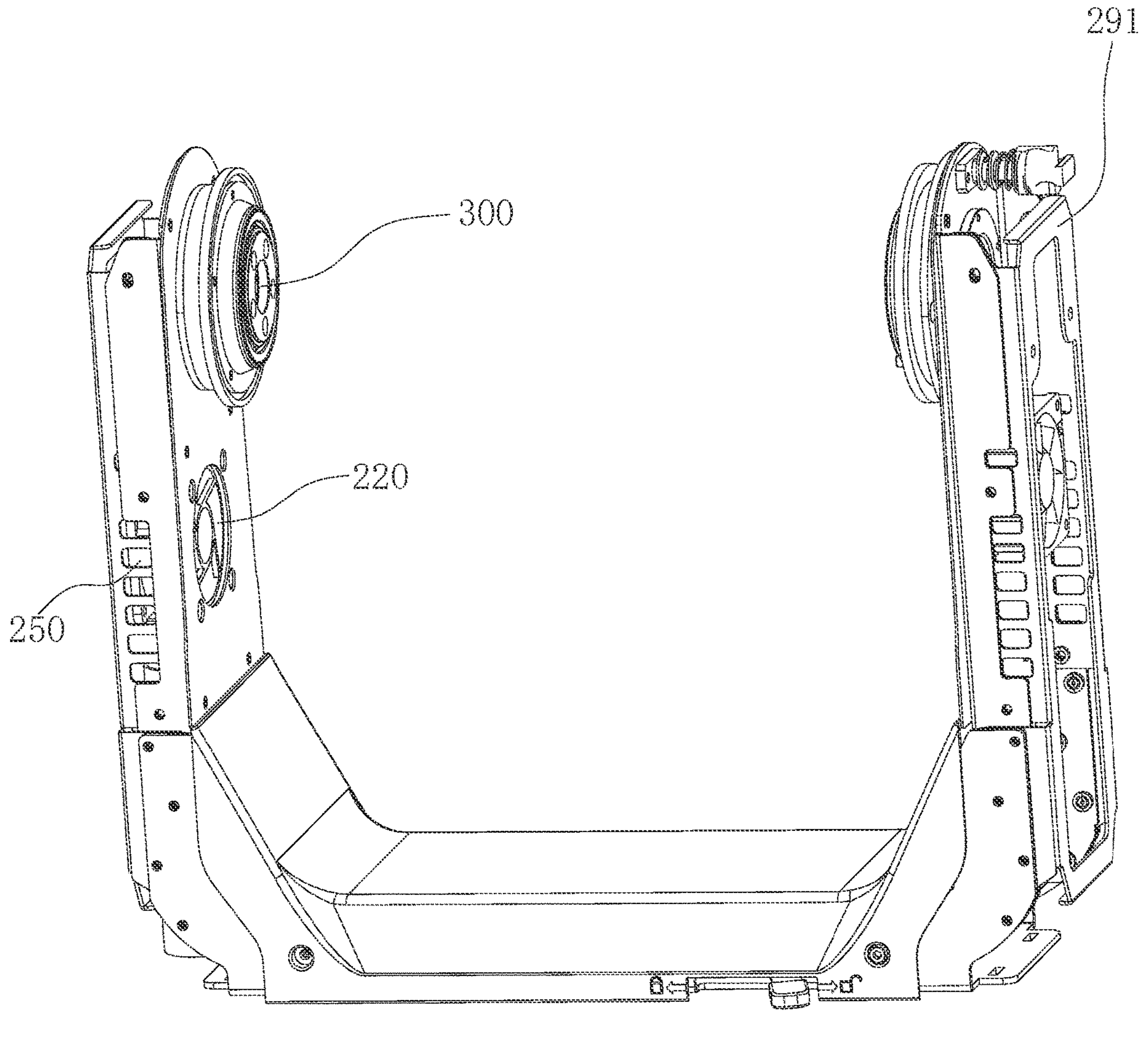
FIG. 4 is another perspective view of the support arm of FIG. 3, with a vertical support of the support arm removed.
Figure 5:
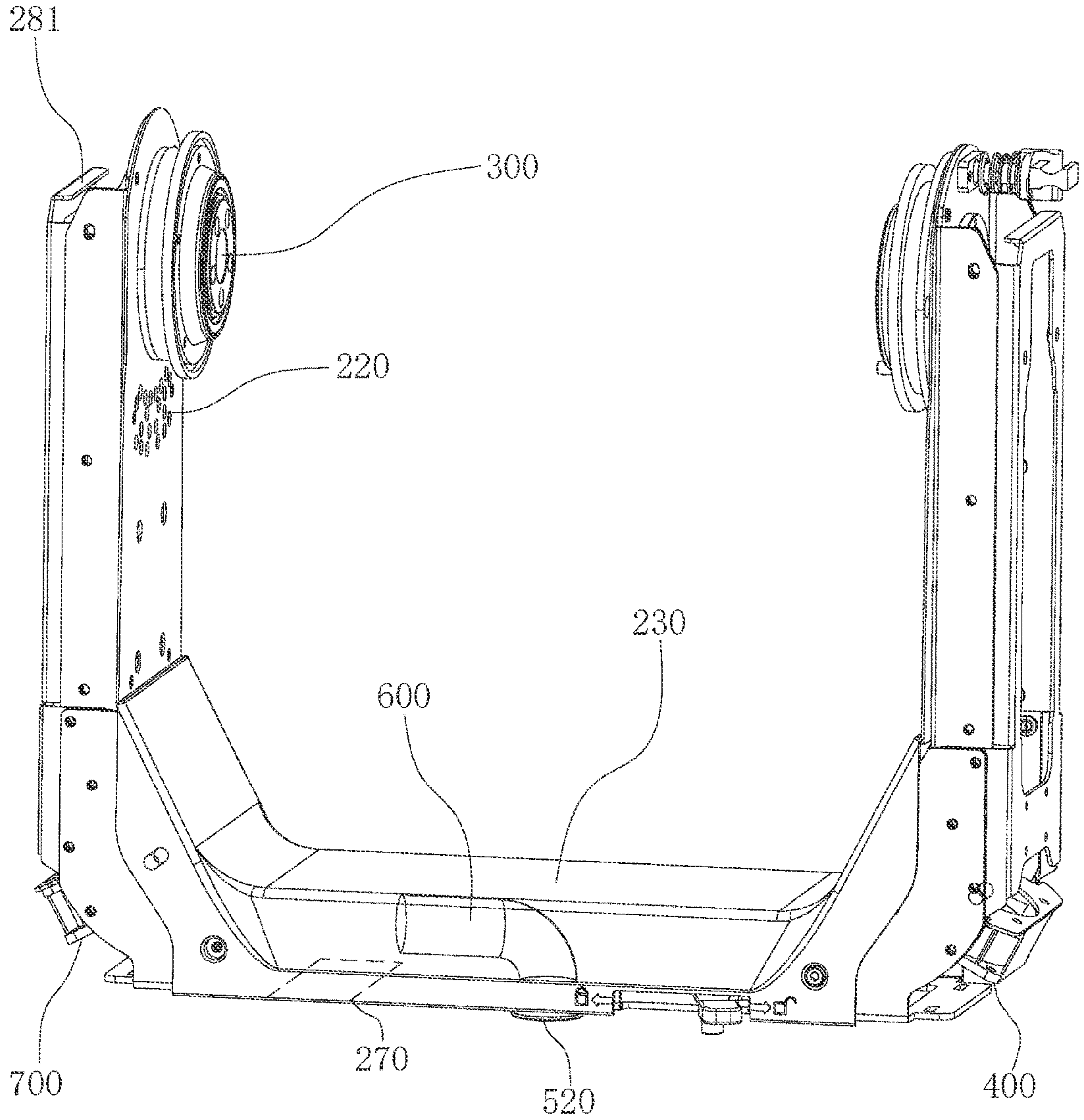
FIG. 5 is another perspective view of the support arm according to another embodiment, showing the first air outlet composed of a plurality of air vents.

With reference to FIGS. 3-5, the support arm 200 includes at least one support plate 281 for supporting. The first blower 400 is arranged on the support plate 281 and corresponding to the pivoting shaft 300 the support plate 281 is provided with a pivoting hole. One end of the pivoting shaft 300 is fastened to the light head 100 and the other end is pivoted to the support plate 281 via the pivoting hole, so that the light head 100 can rotate around the support arm 200.

As mental has good thermal conductivity, the outside of the light head 100 is preferably made of metal material, so that the heat inside the light head 100 can be conducted to the outside thereof.

The first blower 400 is preferably a waterproof blower, which can achieve waterproof performance of the whole light head.

In the illustrated embodiment, the support arm 200 is provided with an accommodating chamber 210 for accommodating the first blower 400, and the side of the chamber 210 close to the light head 100 is provided with a first air outlet 220. It makes the support arm 200 more compact with the blower 400 mounted on the accommodating chamber 210.

The support arm has a plurality of housings 282 which are buckled with each other and surrounded the support plate 281. In this case, the accommodating chamber 210 is formed by the support plate 281, and an air guiding passage is formed between the support plate 281 and the housings 282, so that the air blown by the first blower 400 will flow to the first air outlet 220 along the air guiding passage and finally blow toward the light head 100.

The support arm 200 further includes an air inlet 250 in air communication with the outside. During running of the first blower 400, the air outside enters the support arm 200 via the air inlet 250, flows through the first air outlet 220, and is then blown to the light head 100 with the help of the first blower 400 to make the air around the light head 100 flow rapidly, meanwhile the cool air outside can effectively cool the hot side wall of the light head 100.

The support arm 200 may be additionally provided with an air-inlet gap 260 in air communication with the outside, through which cool air can enter the support arm 200. With the air-inlet gap 260, it thus can reduce the area of the air inlet 250 to achieve good waterproof and dustproof performance.

Referring to FIG. 3 and FIG. 4, according to an embodiment of the present invention, the first air outlet 220 is formed as a through hole. In such case, the first air outlet 220 is covered by the air-outlet surface 410 of the first air blower 400.

Referring to FIG. 1, FIG. 2, and FIG. 5, according to another embodiment of the present invention, the first air outlet 220 is composed of a plurality of air vents closely arranged. In this situation, the first blower 400 is arranged at the side of the support arm away from the first air outlet 220.

In the illustrated embodiment, the support arm 200 has one horizontal support 230 and two vertical supports 240, with each end of the horizontal support 230 connected to one end of each vertical support 240 and the light head 100 pivoted to the other end of each vertical support 240 away from the horizontal support 230. In this embodiment, the accommodating chamber 210 is arranged in the horizontal support 230 and/or the vertical supports 240. In such configuration, the light head 100 can rotate relative to the support arm 200 around at least one dimension, and the first blower 400 can mounted in the horizontal support 230 and/or the vertical supports 240 according to actual demands, which thus can multi-directionally and intentionally blow cooler air to the light head 100, thereby achieving effective heat dissipation for the light head 100.

FIG. 1 and FIG. 5 clearly shows that the accommodating chamber 210 crosses over the horizontal support 230 and the vertical support 240, the first blower 400 is arranged at the joint of the horizontal support 230 and the vertical support 240, with the air-outlet surface 410 of the first blower 400 facing toward the side of the vertical support 240 away from the light head 100. As there is sufficient room for mounting the first blower 400 at the joint, larger fan can be used as the first blower 400, thus further improving the heat-dissipation efficiency for the light head 100.

Alternatively, the first blower 400 can also be arranged perpendicular to the horizontal support 230, with the air-outlet surface 410 of the first blower 400 facing toward the vertical support 240.

In the illustrated embodiment, the first air outlet 220 is arranged close to the pivoting shaft 300 of the light head 100 relative to the support arm 200. In operation of the stage light fixture, the light head 100 may usually rotate beyond the range limited by the support arm 200 during rotation around the pivoting shaft 300. However, with such design the air can be blown to the light head 100 by the first blower 400 as much as possible, even if the light head 100 constantly rotates, and the air flow from the first air outlet 220 can blow the air around the light head to flow.

As FIGS. 1 and 2 shown, the side of the light head 100 close to the support arm 200 is provided with a plurality of first air guiding ribs 130 which are parallel to the length direction of the light head 100. On one hand, such air guiding ribs 130 can increase heat-dissipation area of the cylinder of the light head. On the other hand, air passages are formed between the adjacent air guiding ribs 130, which can guide the air blown by the first blower 400. Particular preference is given that the air guiding ribs 130 is arranged parallel to each other.

FIG. 2 and FIG. 5 clearly show that a base 500 is further included for supporting the support arm 200 to rotate. In this embodiment, a second blower 700 is provided in the support arm 200, which is used for blowing the air around the base 500 to flow and thus cool it. For most of the current stage light fixtures, the control element such as control panel is arranged in the base 500, that is, the rotation of the light head 100 and the support arm 200 are controlled by the base 500. As the space inside the base 500 is usually very limited while with many elements closely mounted, less room is provided for the blower to mount inside the base 500 for heat dissipation. However, the second blower 700 arranged in the support arm in the present embodiment can achieve heat dissipation for the base 500 by blowing the air on the surface of the base to flow and such air promptly entrains the hot air inside the base 500. Therefore, according to the present embodiment the base 500 can be effectively cooled, avoiding over temperature inside the base 500 to damage the control element.

The second flower 700 is preferably mounted in the accommodating chamber 210, and the side of the support arm 200 close to the base 500 is provided with a second air outlet 270.

Advantageously, the housing of the base is made of metal material of good thermal conductivity.

The support arm 200 is pivoted to the base 500 via a rotation shaft 520, so that the light head 100 can rotate relative to the base 500 in at least two dimensions.

In the illustrated embodiment, the side of the base 500 close to the support arm 200 is provided with a plurality of second air guiding ribs 510 extending towards the periphery. Air passages are formed between the adjacent air guiding ribs 510, through which the air blown by the second blower 700 can be guided orderly and flow on the surface of the base 500. In addition, such second air guiding ribs 510 can increase heat-dissipation area of the base 510. Therefore, the heat-dissipation efficiency of the base can be effectively improved.

The stage light fixture may also include a light shaping component for shaping of the light beams, a light filter component for changing the color of the light beams, a pattern component for forming light beams with specific pattern, and/or a lens component for changing divergence angle of the light beams. With such effect-forming modules, the stage light fixture thus can produce rich and varied light effects.

The light emitting lens 120 and the cylinder-shape light head 100 is closely cooperated to form an enclosed chamber, in which the effect-forming modules are arranged for changing light effects of the stage light fixture. Such configuration ensures the sealing of the light head 100 to avoid water entering the light head 100 to damage the elements therein. Meanwhile, the first blower 400 accelerates the flow rate of the air around the light head 100. The light head 100 of the present invention thus meets the requirements of waterproof performance and heat dissipation.

With reference to FIG. 5, the support arm 200 is further provided with a waterproof tube 600 for receiving the electric lines of the electric elements, which can further avoid water entering the accommodating chamber 210 of the support arm 200 with the cool air to cause adverse effects on the electric lines.

Figure 6:
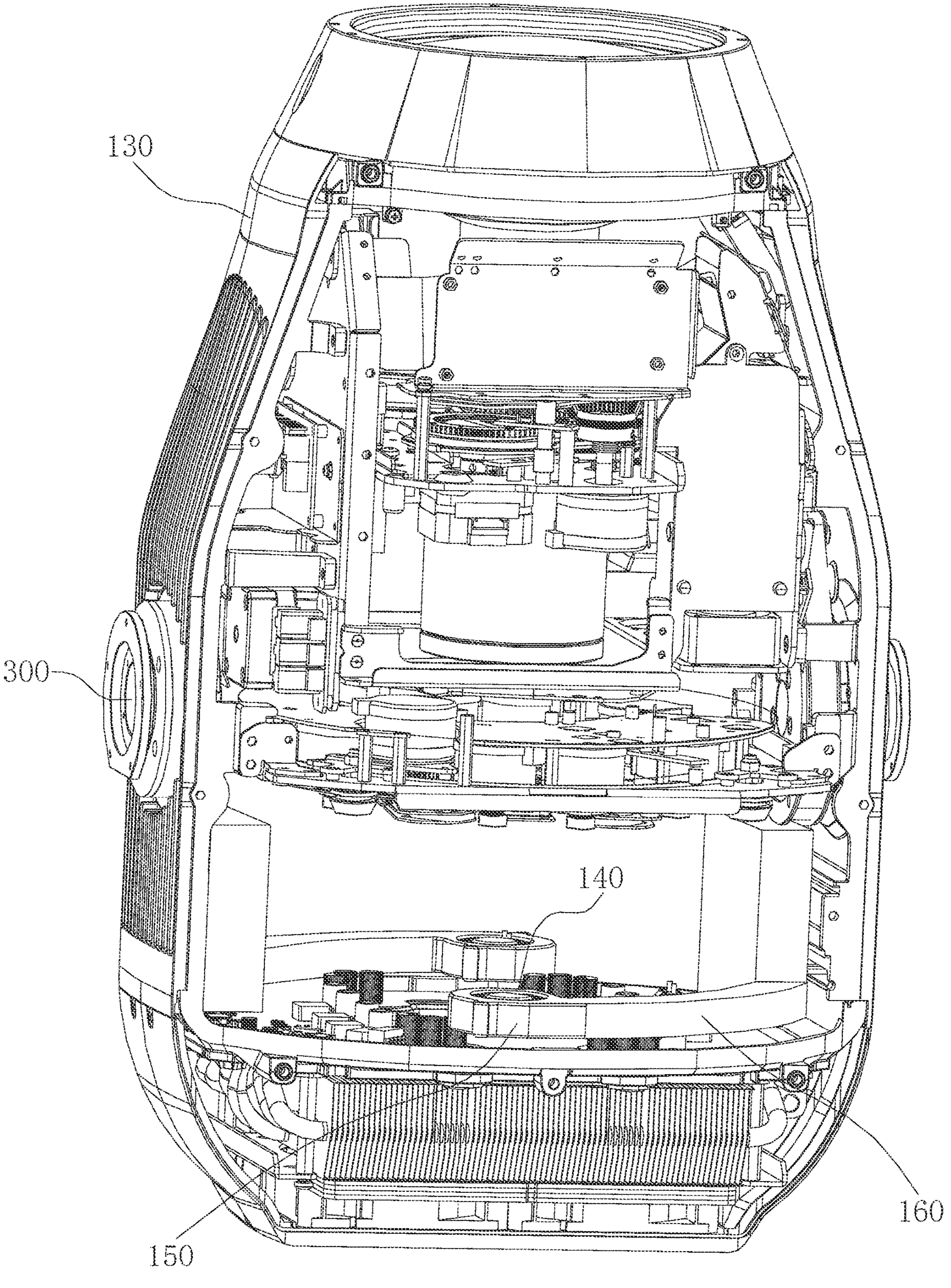
FIG. 6 is a structure schematic view of inside of the stage light fixture, with a circulating fan inside the light head.

With reference to FIG. 6, a circulating fan 150 is further provided in the light head 100 according to a preferred embodiment, which blows the heat inside the light head 100 to at least one side wall of the light head 100 close to the support arm 200. In such configuration, the heat inside the light head 100, especially at the center of the light head 100, can be directed to the inner side wall thereof by means of the circulating fan 150, then conducted to the outer side wall of the light head 100 via heat exchange, and finally removed by the first blower 400.

The circulating fan 150 is particularly in form of an exhaust fan. In this case, an air guide 160 connected to the air outlet of the circuiting fan 150 is further arranged. The circulating fan 150 is arranged close to the light source 140, so that heat air with higher temperature accumulated around the light source 140 during operation can be extracted by the circulating fan 150, further guided to side wall of the light head 100 close to the support arm 200 through the air guide 160 for heat exchange therewith, and finally directed to the outside of the light head 100. On the other hand, the heat air from inside of the light head 100 is cooled into cold air after heat exchange, such cold air is in turn blown to the area close to the light source 140 or the effect assembly from the side of the light head 100 away from the light source 140 for the next heat exchange. With the cooperation of the circuiting fan 150 and the air guide 160, a heat dissipation passage is formed inside of the light head 100 for air circulation therein.

Obviously, the above-mentioned embodiments of the present invention are only examples for clearly illustrating the present invention, rather than limiting the mode of implementation of the present invention. For those of ordinary skill in the art, changes or alterations in other different forms can also be made on the basis of the above description. It is not needed and also not possible to list all the modes of implementation here. Any modification, equivalent replacement, improvement, etc. made within the spirit and principle of the present invention shall be included within the protection scope of the claims of the present invention.

What is claimed is:

1. A stage light fixture with a light head having external heat dissipation, comprising:

a light head for projecting light beams, which is formed as a cylinder with a light outlet which is covered by a light emitting lens; and a support arm for supporting the light head to rotate via a pivoting shaft, wherein at least one first blower is provided in the support arm, which is configured to blow air around the light head to flow and thus cool outside of the light head, and wherein at least one effect-forming module is further provided in the light head for changing the light beams generated by a light source inside the light head, including a light shaping component for shaping the light beams, a light filter component for changing color of the light beams, a pattern component for forming light beams with specific pattern, and/or a lens component for changing divergence angle of the light beams.

2. The stage light fixture according to claim 1, wherein the support arm is provided with an accommodating chamber for accommodating the first blower, and a side of the chamber close to the light head is provided with a first air outlet.

3. The stage light fixture according to claim 2, wherein the support arm has one horizontal support and two vertical supports, with each end of the horizontal support connected to one end of each vertical support and the light head pivoted to the other end of each vertical support away from the horizontal supports, and the accommodating chamber is arranged in the horizontal support and/or the vertical supports.

4. The stage light fixture according to claim 3, wherein the accommodating chamber crosses over the horizontal support and the vertical supports, the first blower is arranged at a joint of the horizontal support and the vertical supports, with an air-outlet surface of the first blower facing toward a side of the vertical support away from the light head.

5. The stage light fixture according to claim 2, wherein the first air outlet is arranged close to the pivoting shaft of the light head relative to the support arm.

6. The stage light fixture according to claim 1, wherein a side of the light head close to the support arm is provided with a plurality of first air guiding ribs which are parallel to a length direction of the light head.

7. The stage light fixture according to claim 1, wherein a base is further included for supporting the support arm to rotate, and a second blower is further provided in the support arm, which is used for blowing air around the base to flow and cool the base.

8. The stage light fixture according to claim 7, wherein a side of the base close to the support arm is provided with a plurality of second air guiding ribs extending towards periphery thereof.

9. The stage light fixture according to claim 1, wherein the light emitting lens and the cylinder-shape light head is closely cooperated to form an enclosed chamber, in which the at least one effect-forming module is arranged for changing light effects of the stage light fixture.

10. The stage light fixture according to claim 1, wherein a circulating fan is further provided in the light head, which is configured to blow heat air inside the light head to at least one inner side wall of the light head close to the support arm.

* * * * *